United States Patent Office 3,494,734
Patented Feb. 10, 1970

3,494,734
PREPARATION OF CYANOGEN
Shizuo Nakamura, Tokyo, Japan, assignor to Sagami Chemical Research Center, Tokyo, Japan, a corporation of Japan
No Drawing. Filed July 22, 1966, Ser. No. 567,072
Claims priority, application Japan, Aug. 2, 1965, 40/46,886
Int. Cl. C01c 3/00
U.S. Cl. 23—151        10 Claims

ABSTRACT OF THE DISCLOSURE

Cyanogen is prepared by reacting HCN with nitrogen dioxide in the presence of cupric ion as a catalyst at a temperature of from 0° C. to 100° C.

---

This invention relates to a new and improved process for the preparation of cyanogen by oxidation of hydrogen cyanide with nitrogen dioxide in the presence of a copper salt solution. In this specification nitrogen dioxide means $NO_2$, $N_2O_4$ or any oxide of nitrogen having a degree of oxidation higher than that of nitrogen monoxide and which is capable of easily dissociating or combining with oxygen to give $NO_2$ and/or $N_2O_4$.

Though cyanogen has not yet been produced on a large commercial scale, it is probable that the compound will come to be one of the important industrial products in the near furture in view of its chemical characteristics. It reacts with hydrogen to give ethylene diamine; it is hydrolyzed to oxamide and further to oxalic acid; it reacts with amines to give corresponding compounds; it can be used in introducing a nitrile radical into organic compounds; and it creates an extremely high temperature between 4,300 and 4,400° C. when burned with oxygen. These are the well-known properties of cyanogen. Among them, it is an important property that cyanogen can be used as a raw material to make oxamide which is one of the most excellent controlled release fertilizers.

The industrial methods to manufacture cyanogen, already proposed, are:

(1) To oxidize hydrogen cyanide with air or oxygen in the presence of a metal catalyst, such as: Au, Ag, Cr, Mo, Mn, Fe, Co, Ni, or Pt-family.

(2) To dissociate hydrogen cyanide into hydrogen and cyanogen, catalyzed by a metal of the IV-, V-, or VIII-family in Periodic Table.

(3) To oxidize hydrogen cyanide by cupric oxide in its water suspension.

(4) To oxidize hydrogen cyanide with nitrogen dioxide in the presence of a certain catalyst at a temperature between 250° and 500° C.

(5) To oxidize hydrogen cyanide with oxygen in a solution of cupric chloride in water.

(6) To oxidize anhydrous hydrogen cyanide with chlorine to obtain hydrogen chloride and cyanogen through chlorocyan as an intermediate.

This invention is based upon the discovery of the inventor that, when hydrogen cyanide and nitrogen dioxide are mixed in a solution of cupric salt, for example a solution of cupric nitrate in water, cyanogen and nitrogen monoxide (NO) are smoothly evolved even at room temperature.

This reaction is carried out very efficiently and economically because: (i) the amounts of HCN and $NO_2$ used in molar ratio of 2:1 are just chemically equivalent to each other, (ii) the reaction proceeds easily even at room temperature, (iii) the rate of conversion is high, that is, the unreacted HCN content in product gas is very low, (iv) the yield can be more than 90 mol percent based on the hydrogen cyanide charged to the reaction, and (v) the size of a reaction apparatus can be smaller if a liquid phase reaction method is adopted.

The six methods as mentioned above are not as efficient as the present invention, because: the methods (1) and (2) each give a lower yield, and in each of them the reaction must be carried out at a high temperature; the method (3) requires a more complicated process by which the cupric oxide used must be recovered after the end of reaction; the method (4) requires a higher temperature and gives a lower yield, and the unreacted reactants must be recovered because the amounts of HCN and $NO_2$ used are not chemically equivalent to each other, and besides there is raised a problem concerning the life and activity of the catalyst; in the method (5) the reaction to oxidize cuprous into cupric salt with gaseous oxygen is much slower than the oxidation of hydrogen cyanide with cupric salt; and the method (6) can give a good yield, but it requires a costly process to make anhydrous hydrogen cyanide.

When hydrogen cyanide is mixed with $Cu^{++}$ solution, brown precipitate is formed, and then it dissociates easily into white cuprous cyanide and cyanogen. When the cupric salt used is a nitrate and the quantity used of hydrogen cyanide is not so large, such brown precipitate redissolves by agitation, and the solution becomes green in color. By adding the equivalent of nitrogen dioxide as an oxidizer to the green solution, cyanogen and nitrogen monoxide are vigorously evolved from the resulting mixture when it is warmed, or steadily evolved therefrom even when kept at room temperature, and in the meantime the color gradually changes to the original blue. Nitrogen dioxide to be used in this reaction is not always required to be highly pure. It may contain NO, $N_2O_3$ and/or $O_2$. Such a reaction as this one is also carried out when catalyzed by solid catalyst containing a cupric salt such as cupric nitrate in the form of blue crystal or when catalyzed by silica and/or alumina gel each impregnated with a solution of a cupric salt.

When hydrogen cyanide and nitrogen dioxide are mixed in the molar ratio of 2:1 and then continuously introduced into a cupric nitrate solution (0.5 to 4 mol/1000 g. of water concentration) at 0° C. to room temperature, the solution changes in color from blue to green and then soon to dark and the gas is evolved vigorously. In the gas, at first nitric oxide is richer than cyanogen and soon both become almost equal in concentration. Some amounts of carbon dioxide and nitrogen gas are contained in the gas. If the stirring of the solution is not sufficient, product gas will contain unreacted nitrogen dioxide and hydrogen cyanide each in some amount.

When the reaction is carried out under pressure, a considerably large quantity of carbon dioxide is evolved, and also a large quantity of oxamide precipitates. The higher the temperature, the larger the amount of by-products that is formed. Such undesirable reaction conditions must not be employed in order to avoid the following reactions:

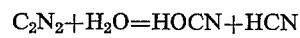

$C_2N_2 + H_2O = HOCN + HCN$

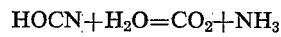

$HOCN + H_2O = CO_2 + NH_3$

$2NH_3 + NO + NO_2 = 2N_2 + 3H_2O$

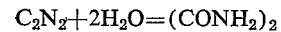

$C_2N_2 + 2H_2O = (CONH_2)_2$

To apply this invention to industrial production of cyanogen, various reaction systems can be adopted:

(1) By using a con-current pipe flow reaction system, hydrogen cyanide and nitrogen dioxide are mixed with cupric salt solution in a liquid state.

(2) By using a counter-current contact system, cupric salt solution is poured at the top of a reaction tower, and hydrogen cyanide and nitrogen dioxide are introduced each in a gas state at the bottom thereof.

(3) Through a fixed bed solid catalyst which contains cupric ions, hydrogen cyanide and nitrogen dioxide are sent each in gaseous state.

(4) Into a vessel containing cupric salt solution sufficiently stirred therein, hydrogen cyanide and nitrogen dioxide are poured each in a liquid state.

In these four cases effluent gas product is separated into cyanogen and nitrogen monoxide, and the latter is oxidized by oxygen or air to nitrogen dioxide to use again in a second reaction.

Preferable reaction conditions for the preparation of cyanogen are: a temperature of 0° to 15° C., a pressure of 760 mm. Hg or less and a concentration of cupric nitrate of 3 mol/1000 g. of water at the beginning.

EXAMPLE 1

In a flask, hydrogen cyanide and nitrogen dioxide are mixed while excluding air and brought in contact with 5 ml. of cupric nitrate water solution (1 mol/1000 g. of water concentration), and the flask is shaken and heated in boiling water to warm the reactants in the flask. The following table is the analysis of the product gas by gas chromatography carried out while the gas was kept at 0° C.

| | Reactants | | | Product gas, molar ratio $NO:C_2H_2HCN$ | No. of moles obsd. in gas phase 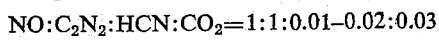 ×100 No. of moles calcd. in gas phase |
|---|---|---|---|---|---|
| | HCN, grams | $NO_2$, grams | Molar ratio $HCN:NO_2$ | | |
| No. 1 | 0.224 | 0.198 | 1:0.47 | 1:1:0.1 | 84.2% |
| No. 2 | 0.349 | 0.244 | 1:0.41 | 0.98:1:0 | 77.1% |
| No. 3 | 0.248 | 0.390 | 1:0.92 | 1.20:1:0 | 87.1% |

EXAMPLE 2

0.471 g. of hydrogen cyanide and 0.405 g. of nitrogen dioxide containing nitrogen monoxide are mixed in a 633-ml. flask evacuated prior to the mixing, and the resulting mixture is heated up to 100° C. for two hours and left overnight at room temperature. Cyanogen formed was 2.8 mol percent of the hydrogen cyanide used. Then 0.2 g. of cupric nitrate blue crystal is added into the flask and the mixture heated to 100° C. The reaction soon proceeds and the molar ratio of $C_2N_2$ to HCN becomes 78:22 in the gas mixture evolved. After excessive nitrogen dioxide is further added to the reaction mixture in the flask, hydrogen cyanide is completely oxidized to cyanogen.

EXAMPLE 3

HCN 0.285 g. and $NO_2$ 0.239 g. are mixed in a flask evacuated before the mixing, and the mixture is brought in contact with 0.5 ml. of cupric nitrate solution (1 mol./ltr. concentration) and then heated to 90° C. Ninety-four percent of the product gas is in the gaseous state without dissolving in the solution, and its analysis shows the following molar ratios:

$$NO:C_2N_2:HCN:CO_2 = 1:1:0.01-0.02:0.03$$

EXAMPLE 4

Into 100 g. of cupric nitrate solution (3 mol/1000 g. of water concentration) three separate mixtures of 5.4 g. of hydrogen cyanide and 4.6 g. of nitrogen dioxide are poured successively one after another (total 30 g.) at 0° to 5° C. Each of 500-ml. portions of gas evolved from this reaction is analyzed by gas chromatography to give the following results:

Product.—NO: 6918 ml., $C_2N_2$: 6633 ml., $CO_2$: 439 ml., and HCN: 741 ml.

HCN conversion: 94.9%
Yield ratio of $C_2N_2$ to converted HCN: 97%
Yield ratio of $C_2N_2$ to HCN charged: 92%
Yield of by-product $CO_2$: 3 mol percent

EXAMPLE 5

A mixture of 16.2 g. of hydrogen cyanide and 13.8 g. of nitrogen dioxide is poured into 100 g. of cupric nitrate water solution (3 mol/1000 g. of water concentration) a temperature of 15° C. The gas product evolved is collected in a 20-liter flask under reduced pressure, and a portion of the gas is analyzed by gas chromatography. Another portion of the gas is carefully analyzed by using two different titration analyses. The results are:

Molar percent of the gas mixture:
NO: 49.3%, $N_2$: 1.7%, $C_2N_2$: 44.6% (mean value), $CO_2$: 2.7%, HCN: 1.7%.
HCN conversion: 98.3%
Yield ratio of $C_2N_2$ to converted HCN: 92.2%
Yield ratio of $C_2N_2$ to HCN charged: 90.6%

EXAMPLE 6

Hydrogen cyanide 5.4 g. and nitrogen dioxide 4.6 g. are mixed with 200 g. cupric nitrate water solution of 1 mol/1000 g. water concentration at 5° C. under pressure of 9 kg./cm². 100 mol percent of HCN is converted, but $C_2N_2$ yield is 53 mol percent. $CO_2$ content in the product gas mixture is 12 mol percent.

EXAMPLE 7

Hydrogen cyanide 8.1 g. and nitrogen dioxide 6.9 g. are mixed with 150 g. of 1 mol/1000 g. of cupric nitrate water solution at 100° C. in an autoclave. The pressure rises up to 69 kg./cm.² owing to evolution of gas in the autoclave. Hydrogen cyanide is completely converted, considerably large amounts of oxamide and of carbon dioxide are produced and cyanogen yield is only about 1%.

EXAMPLE 8

Into 100 g. of cupric chloride solution (1 mol/1000 g. of water concentration) 5.4 g. of hydrogen cyanide and 4.6 g. of nitrogen dioxide are poured gradually. Cyanogen evolved from the solution is 43.2 mol percent of the hydrogen cyanide used, and hydrogen cyanide conversion is 97.6%.

EXAMPLE 9

Into 100 g. of cupric sulfate solution (1 mol/1000 g. of water concentration) 5.4 g. of hydrogen cyanide and 4.6 g. of nitrogen dioxide are added gradually. Cyanogen evolved from the solution is 50.7 mol percent of the hydrogen cyanide used, and hydrogen cyanide conversion is 98.5%.

EXAMPLE 10

Into 100 g. of cupric acetate solution (0.3 mol/1000 g. of water concentration) 5.4 g. of hydrogen cyanide and 4.6 g. of nitrogen dioxide are gradually added. Cyanogen evolved from the solution is 62.6 mol percent of the hydrogen cyanide used, and hydrogen cyanide conversion is 98.0%.

I claim:

1. A process for the manufacture of cyanogen, which comprises reacting hydrogen cyanide with nitrogen dioxide in the presence of cupric ion at a temperature of from 0° C. to 100° C.

2. A process according to claim 1, in which the reaction is carried out in the presence of blue crystals of cupric nitrate.

3. A process according to claim 1, in which said cupric ion is provided by a member selected from the group consisting of cupric nitrate, cupric sulphate, cupric chloride or cupric acetate.

4. A process according to claim 1, in which said nitrogen dioxide is a member selected from the group consisting of $NO_2$, $N_2O_4$, oxides of nitrogen having a degree of oxidation higher than that of nitrogen monoxide and being capable of dissociating into a product selected from the class consisting of $NO_2$, $N_2O_4$ and mixtures thereof and oxides of nitrogen having a degree of oxidation higher than that of nitrogen monoxide and being capable of combining with oxygen to form a product selected from the class consisting of $NO_2$, $N_2O_4$ and mixtures thereof.

5. A process according to claim 1, in which the reaction is carried out in the presence of a solid catalyst consisting of a carrier selected from the group consisting of silica, alumina and mixtures thereof impregnated with an aqueous solution containing cupric ion.

6. A process according to claim 1, in which the reaction is carried out in an aqueous cupric salt solution.

7. A process according to claim 6, in which the cupric salt is cupric nitrate.

8. A process according to claim 6, in which the cupric salt is cupric chloride.

9. A process according to claim 6, in which the cupric salt is cupric sulphate.

10. A process according to claim 6, in which the cupric salt is cupric acetate.

References Cited

UNITED STATES PATENTS

| | | | |
|---|---|---|---|
| 2,884,308 | 4/1959 | Fierce et al. | 23—151 |
| 2,951,744 | 9/1960 | Fierce et al. | 23—151 |

OSCAR R. VERTIZ, Primary Examiner

HOKE S. MILLER, Assistant Examiner

U.S. Cl. X.R.

23—195; 252—976; 260—561